United States Patent [19]

Maruyama et al.

[11] Patent Number: 5,369,322
[45] Date of Patent: Nov. 29, 1994

[54] ELECTROMAGNETIC MOTOR OF THE FINITE ROTATIONAL TYPE

[75] Inventors: Toshiki Maruyama; Akira Akahane; Yoshinori Ito, all of Nagano, Japan

[73] Assignee: Harmonic Drive Systems, Inc., Kanagawa, Japan

[21] Appl. No.: 943,563

[22] Filed: Sep. 11, 1992

[30] Foreign Application Priority Data

Nov. 21, 1991 [JP] Japan .................. 3-104253

[51] Int. Cl.$^5$ .............. H02K 33/10; H02K 33/14; H02K 35/00
[52] U.S. Cl. ............................ 310/39; 310/68 B
[58] Field of Search ............... 310/15, 39, 181, 179, 310/259, 68 B, 190, 156, 114

[56] References Cited

U.S. PATENT DOCUMENTS

| | | | |
|---|---|---|---|
| 3,581,173 | 5/1971 | Hood | 318/254 |
| 3,701,042 | 10/1972 | Dukes | 318/138 |
| 4,009,406 | 2/1977 | Inabira | 310/114 X |
| 4,135,119 | 1/1979 | Brosens | 318/128 |
| 4,206,374 | 6/1980 | Goddijin | 310/114 X |
| 4,804,873 | 2/1989 | Shiraki et al. | 310/67 R |
| 5,122,697 | 6/1992 | Horst | 310/181 |

FOREIGN PATENT DOCUMENTS

5756304 12/1978 Japan.

Primary Examiner—Steven L. Stephan
Assistant Examiner—E. To
Attorney, Agent, or Firm—Burns, Doane, Swecker & Mathis

[57] ABSTRACT

An electromagnetic motor of the finite rotational type has an improved rotor-returning mechanism for exerting a magnetic force to return its rotor to the initial angular position in a non-excited condition. The rotor-returning mechanism is comprised of a permanent magnet fixedly mounted on a stator and a permanent magnet mounted around the rotor. The permanent magnets are arranged such that, a magnetic attractive force generated between the permanent magnets functions to return the rotor to the initial angular position. The rotor-returning mechanism can be constitued by first and second ring-shaped permanent magnets mounted on the rotor. The N and S poles of the first magnet are offset in a the circumferential direction from those of the second magnet so as to generate a magnetic torque for returning the rotor to the initial angular position.

11 Claims, 7 Drawing Sheets

ELECTROMAGNETIC MOTOR OF THE FINITE ROTATIONAL TYPE

BACKGROUND OF THE INVENTION

1. Field of the Invention

The present invention relates to an electromagnetic motor of the finite rotational type for accurately rotating a light reflector or the like between predetermined angular positions. In particular, the present invention pertains to an electromagnetic motor of the finite rotational type which is provided with an improved mechanism for returning the rotor thereof to its initial angular position.

2. Prior Art Description

The electromagnetic motor of the finite rotational type is widely utilized as a source of rotating motion for rotational members which must be rotated to a prescribed position accurately with high response. For example, in the field of optical scanning, this kind of motor is utilized to rotate a light reflector for deflecting or scanning a light beam. This type of electromagnetic motor is disclosed, for example, in Japanese Patent Publication No. SHO 57-56304. Typically, an electromagnetic motor of the finite rotational type has a stator enclosing a rotor made of ferromagnetic material, the stator being provided with a magnetic flux generating mechanism which generates a magnetic flux for rotating the rotor within a predetermined range of angular positions. The magnetic flux generating mechanism has a plurality of magnetic pole portions, around which respective coil windings are wound. The electromagnetic motor of the finite rotational type is also provided with a sensing means for sensing the rotational angular position of the rotor. The sensing means is typically of the capacitance position transducing type.

The electromagnetic motor of this type is also provided with a mechanism which exerts a force for returning the rotor to its initial angular position. Since the rotor does not operate by excitation when it falls into the position at which the poles thereof are aligned with those of the stator, it must be returned to a predetermined angular position at which the poles thereof are angularly offset from those of the stator by a predetermined amount. The mechanism for returning the rotor to its initial angular position is provided for this purpose. In the above-mentioned Patent Publication, a torsion bar is accommodated along the rotational axis of the rotor for exerting a force to return the rotor to its initial angular position when de-excited. However, the rotor-returning mechanisms of the prior art have defects. Since they consist of many elements which have to be assembled, they are complicated in structure and prone misalignment. When the rotor-returning mechanism is misaligned, the rotor does not return to its initial position accurately. In addition, the rotor may be deflected radially as it rotates.

The rotor of an electromagnetic motor of this type is generally rotatably supported at both ends by bearing means. The rotor is desirably supported by the bearing means such that it does not deflect radially when rotating. However, due to manufacturing inaccuracy, misalignment or the like of the bearing means, the rotor is inevitably supported in a condition slightly deflectable in the radial direction. The rotor therefore deflects radially when rotating. The radial deflection of the rotor degrades the accuracy of the sensing mechanism for sensing the rotational angular position of the rotor.

SUMMARY OF THE INVENTION

Accordingly, one object of this invention is to provide an electromagnetic motor of the finite rotational type which has an improved rotor-returning mechanism.

Another object of this invention is to provide an electromagnetic motor of the finite rotational type having an improved rotor-returning mechanism which functions to prevent the rotor from deflecting radially while rotating.

Still another object of this invention is to provide an electromagnetic motor of the finite rotational type which has an improved rotor-returning mechanism and a sensing means for sensing the rotational angular position of the rotor accurately.

In order to achieve the above and other objects of the present invention, according to this invention, there is provided an electromagnetic motor of the finite rotational type which comprises a rotor, a stator provided surrounding the rotor and comprised of ferromagnetic material and coil windings so as to form a plurality of stationary electromagnetic poles, and a bearing means for supporting the rotor rotationally at least in a predetermined angular range. The rotor can be controllably rotated to a desired angular position within the predetermined angular range by controlling the magnetic flux between the poles of the rotor and the electromagnetic poles of the stator. The electromagnetic motor comprises a rotor-returning means for exerting a magnetic force to return the rotor to an initial rotational angular position and hold it therein when the electromagnetic motor is in a non-excited condition. The rotor has a permanent magnet with a plurality of magnetic poles. The rotor-returning means according to the present invention comprises a permanent magnet which is fixedly mounted on the stator to face the permanent magnet of the rotor so that a magnetic attractive force is generated between the permanent magnets of the rotor and the stator. The rotor itself is preferably made of permanent magnetic material.

In a preferred embodiment, the electromagnetic motor of the finite rotational type is provided with a photo-potentiometer for sensing the rotational angular position of the rotor. The photo-potentiometer can be constituted of a light emitting element, a light receiving element, and a rotational member integrally rotating with the rotor and defining a light path from the light emitting element to the light receiving element. This rotational member for defining the light path is formed with either a portion through which a light passes or a light-reflective region. The light passing-portion or light-reflecting region is configured so that the light path defined by the light-passing portion or light-reflecting region changes in accordance with the rotational angular position of the rotor. The light emitting element is preferably a laser diode.

The rotor-returning means may be comprised by first and second ring-shaped permanent magnets instead of the permanent magnet mounted on the stator. These ring-shaped permanent magnets are mounted coaxially on the rotor along the axial direction of the rotor, and each has a pair of magnetic N and S poles. The magnetic poles of the first ring-shaped permanent magnet are offset in the circumferential direction from those of the second ring-shaped permanent magnet by an angle in the range of 90 degrees to 180 degrees. By this arrangement of the ring-shaped permanent magnets, a magnetic force is generated between the ring-shaped permanent magnets and the stator, which functions as a torque for returning the rotor toward its initial angular position.

In another aspect of this invention, there is provided an electromagnetic motor of the finite rotational type which comprises a rotor having 2 n (n being an integer) permanent magnet poles, a stator provided surrounding the rotor and comprised of ferromagnetic material and coil windings so as to form n pairs of stationary electromagnetic poles, and a bearing means for supporting the rotor rotationally at least in a predetermined angular range, wherein the rotor can be controllably rotated to a desired angular position within the predetermined angular range by controlling the magnetic flux between the poles of the rotor and the electromagnetic poles of the stator. The electromagnetic motor comprises a rotor-returning means for exerting a magnetic force to return the rotor to its predetermined rotational angular position and hold it in this position in a non-excited condition, wherein each of the magnetic poles of the stator is formed on the surface facing the rotor with a groove setback from the outer surface of the rotor and extending in the axial direction. The width of the grooves is set larger than the gap between the adjacent magnetic poles of the stator so as to generate a magnetic torque for forcing the magnetic poles of the rotor to stay in an angular position 90 degrees of electrical angle apart from the magnetic poles of the stator.

The rotor-returning means may be comprised of a plurality of auxiliary poles provided on the stator instead of the grooves formed on the pole surfaces of the stator. More specifically, the stator can be provided with 2n auxiliary poles offset 90 electrical degrees in the circumferential direction with respect to the 2 n magnetic poles of the stator. The width of the auxilary poles is set larger than that of the magnetic poles of the stator, so that, in a non-excited condition, the rotor is applied with a magnetic torque to hold the magnetic poles of the rotor in an angular position 90 degrees of electrical angle apart from the magnetic poles of the stator.

BRIEF DESCRIPTION OF THE DRAWINGS

The above and other objects and advantages of this invention will be more apparent from the following description in conjunction with the attached drawings, in which.

PREFERRED EMBODIMENTS OF THE INVENTION

While the present invention will be described with respect to preferred embodiments, it is not intended to limit the present invention to these embodiments. On the contrary, it is intended to cover all alternatives, modifications and equivalents thereof as may be included in the present invention defined by the attached claims.

First Embodiment

Figure 1:
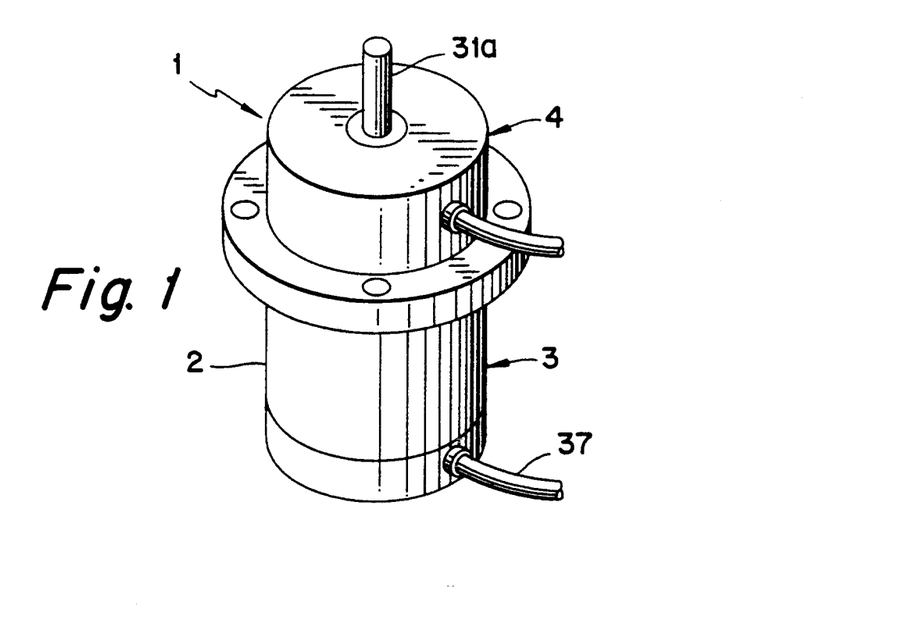
FIG. 1 is a perspective view of a first embodiment of the electromagnetic motor according to the present invention.
Figure 2:
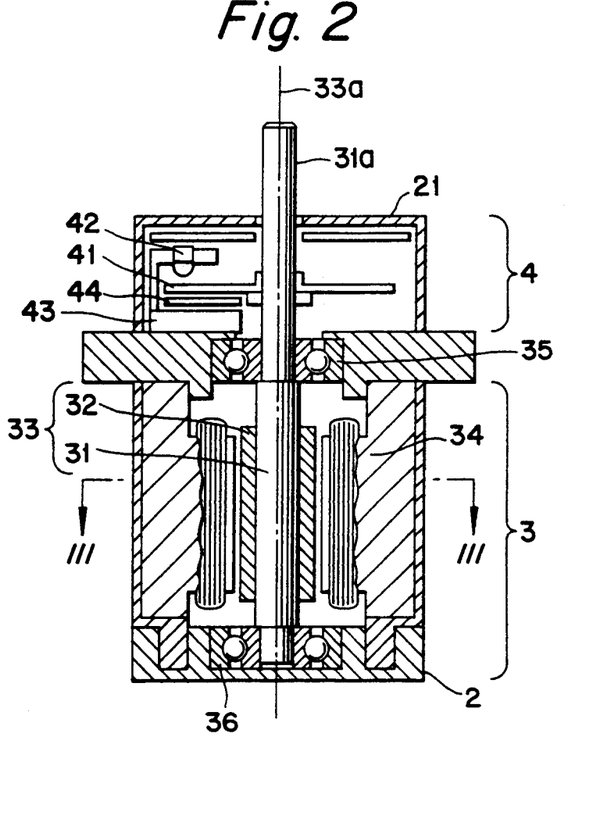
FIG. 2 is a longitudinal sectional view of the electromagnetic motor of FIG. 1.

Referring now to FIGS. 1 and 2, there is described an electromagnetic motor of the finite rotational type according to the present invention. The electromagnetic motor 1 has a tubular housing 2, in which a motor portion 3 and a position sensor 4 are accommodated coaxially. The motor portion 3 has a rotor 33 positioned at the center thereof. The rotor 33 consists of a rotational shaft 31 and a tubular permanent magnet 32 fixedly mounted around the rotational shaft 31. A tubular stator 34 coaxially encloses the permanent magnet 32. The rotational shaft 31 of the rotor 33 has proximal and distal ends projecting from the circular ends of the permanent magnet 32, the proximal and distal ends being supported on the housing 2 via ball bearings 35 and 36, respectively, so that the rotational shaft 31 is rotatable about a central axis 33a. The proximal end of the rotational axis 31 extends through the ball bearing 35 and the center of the position sensor 4 and projects from a front end 21 of the housing 2. The projecting portion of the rotational shaft 31 serves as an output shaft 31a.

Figure 3:
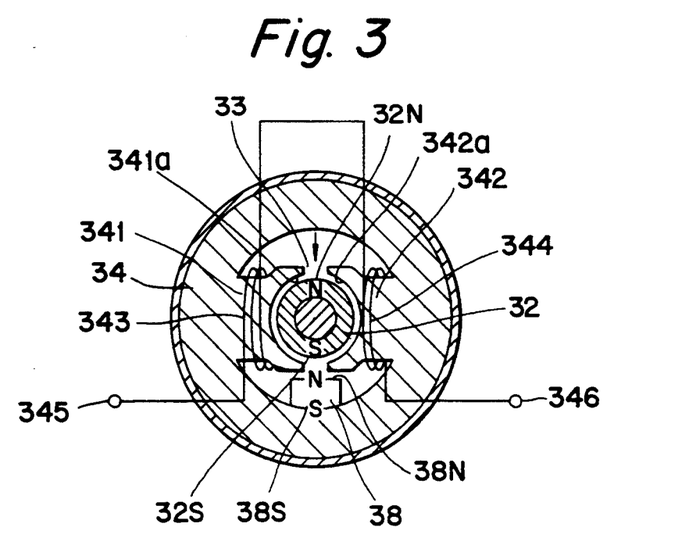
FIG. 3 is a cross-sectional view of the electromagnetic motor taken along line III—III of FIG. 2.

Referring also to the cross-sectional view of the motor 1 in FIG. 3, the permanent magnet 32 has a pair of magnetic poles 32N and 32S positioned in the diametrical direction of the circular section of the magnet. The stator 34 is formed on its inner surface with a pair of pole portions 341 and 342 projecting radially and inwardly. These pole portions 341 and 342 are positioned in the diametrical direction and have an axial length encompassing the permanent magnet 32 of the rotor 33. The pole portions 341 and 342 have pole surfaces 341a and 342a facing the outer surface of the permanent magnet 32. The pole surfaces 341a and 342a are arch-shaped so as to form a constant air gap between themselves and the outer surface of the magnet 32. The pole portions 341 and 342 are provided with field windings 343 and 344 which are connected to a power source (not shown) via a power line 37 and a magnetic flux control circuit (not shown). As the magnetic flux control circuit can be of a conventional type, it will not be described here.

As shown in FIG. 3, a permanent magnet 38 is fixedly mounted on the inner surface of the stator 34 at an angularly intermediate position between the pair of pole portions 341 and 342. It has an axial length encompassing the permanent magnet 32 of the rotor 33. In the present embodiment, the magnetic N pole 38N of the permanent magnet 38 is positioned facing the rotor side.

Figure 4:
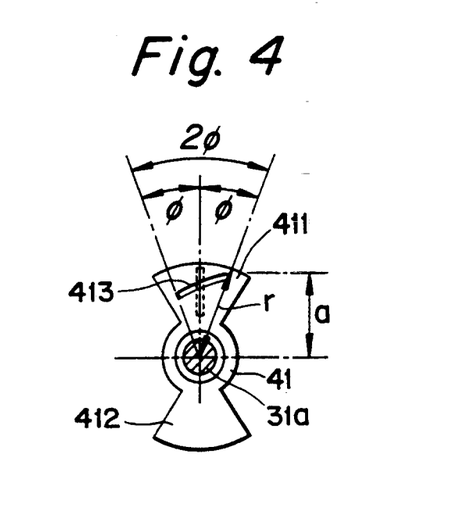
FIG. 4 illustrates a rotational slit plate of the electromagnetic motor of FIG. 1.
Figure 5:
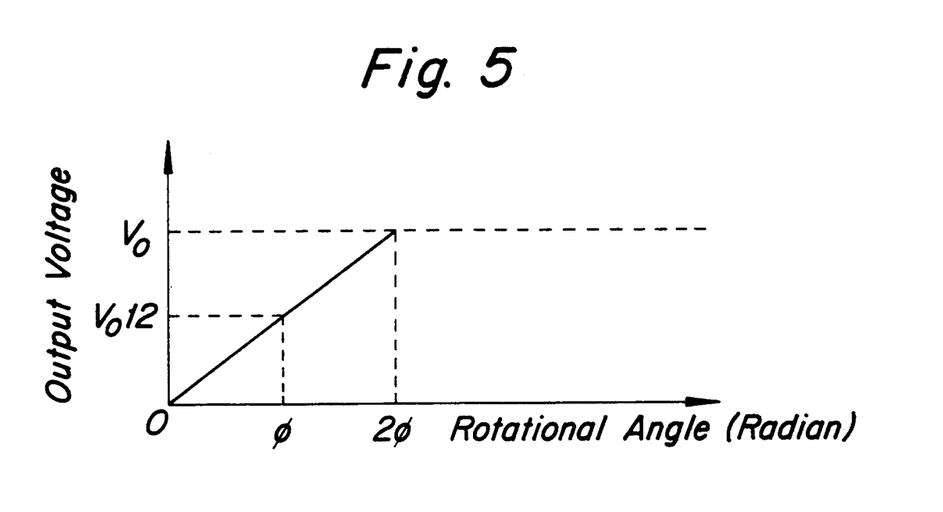
FIG. 5 is a graph showing the change of output voltage with rotational angle of a photo-potentiometer provided in the electromagnetic motor of FIG. 1.

Now, referring further to FIGS. 4 and 5, the position sensor 4 will be described. The position sensor 4 of the present embodiment is a photo-potentiometer which has a rotational slit plate 41 coaxially attached to the output shaft 31a, a laser diode 42 and a semiconductor position sensing element 43 positioned stationarily and facing each other across the rotational slit plate 41, and a stationary slit plate 44 positioned between the laser diode 42 and the semiconductor position sensing element 43. The rotational slit plate 41 is shaped as shown in FIG. 4 and is formed with a pair of fan-shaped portions 411 and 412 of rotational symmetry spreading over an angle $2\phi$. The angle $2\phi$ is the maximum range of the rotational angle of the motor 1 of the present embodiment. The fan-shaped portion 411 is formed therein with a light-passing slit 413 having the shape of a spiral segment and spreading over the angle $2\phi$. The slit 413 is a segment of a spiral centered on the center of the rotational slit plate 41. Therefore, the radius r and the rotational angle $\Theta$ of the slit plate 41 satisfies the relationship $r = a - (\delta/2\pi)\Theta$, wherein $\delta$ is the pitch of the spiral. As the rotational slit plate 41 rotates, the slit 43 is also rotated, so that the portion of the slit 413 facing the laser diode 42 moves radially. As a result, the light receiving point at the semiconductor position sensing element 43 is shifted. Thus the semiconductor position sensing element 43 produces an electrical signal corresponding to the rotational angle of the slit plate 41 (the rotor 33). An example of the output signal from the position sensing element 43 is illustrated in FIG. 5, from which it can be seen that the output voltage from the position sensing element 43 is directly proportional to the rotational angle of the rotor. The maximum rotational angle range of a typical electromagnetic motor of the finite rotational type is generally 20 to 30 degrees. Therefore, it is possible to adopt a high value for $\delta/2\pi$ so as to obtain a high resolution for enabling the angular position sensing to be conducted with high accuracy.

The rotor 33 of the electromagnetic motor 1 is initially set as shown in FIG. 3. Specifically, a magnetic attractive force arises between the S pole 32S of the rotor-side permanent magnet 32 and the N pole 38N of the stator-side permanent magnet 38. The magnetic attractive force acts on the rotor 33 to return it to and hold it at the initial angular position as shown in FIG. 3. In this initial condition, the center of the slit 413 of the rotational slit plate 41 is positioned facing the laser diode 42 and the semiconductor position sensing element 43.

When drive power is applied to the field windings 343 and 344 under the control of the magnetic-field control circuit (not shown), the rotor 33 is rotated by an angle whose magnitude depends on the magnitude of the magnetic field formed between the stator and rotor. Since the mechanism of the rotational operation of the rotor is well known, a detailed description thereof will not be given here.

With the rotation of the rotor 33, the rotational slit plate 41 of the position sensor 4 integrally mounted on the rotor 33 is also rotated. As a result, the light receiving point on the semiconductor position sensing element 43 is shifted radially in proportion to the rotational angle of the slit plate 41, so that the output signal of the element 43 changes as shown in FIG. 5. The actual rotational angular position of the rotor 33 is determined from the output signal of the element 43. The magnetic-field control circuit controls the drive power in accordance with the so-determined actual position of the rotor 33 so as to rotate it precisely to a desired position.

Meanwhile, owing to the presence of the permanent magnet 38 mounted on the stator 31, the rotor 33 is attracted radially. Thus, since the rotor 33 is constantly biased radially, radial deflection thereof can be avoided. When the supply of the power to the field windings 343 and 344 is ceased, the rotor 33 returns to its initial angular position as shown in FIG. 3 under the attractive force of the permanent magnet 38.

As explained above, in the present embodiment, the permanent magnet 38 serves to return the rotor 33 to its initial position as well as to bias the rotor 33 radially for preventing it from radially deflecting.

In the present embodiment, the rotational slit plate 411 is formed with the slit 413. Instead of the slit 413, the slit plate may be formed with a light-permeable portion. Alternatively, the plate can be formed with a light-reflecting portion for reflecting the light emitted from the light emitting element to the light receiving element. In addition, the shape of the slit, light-permeable portion or the light-reflecting portion is not limited to a spiral curve, but may be any curve so long as the light path defined thereby changes in accordance with the rotor.

Second Embodiment

Figure 6:
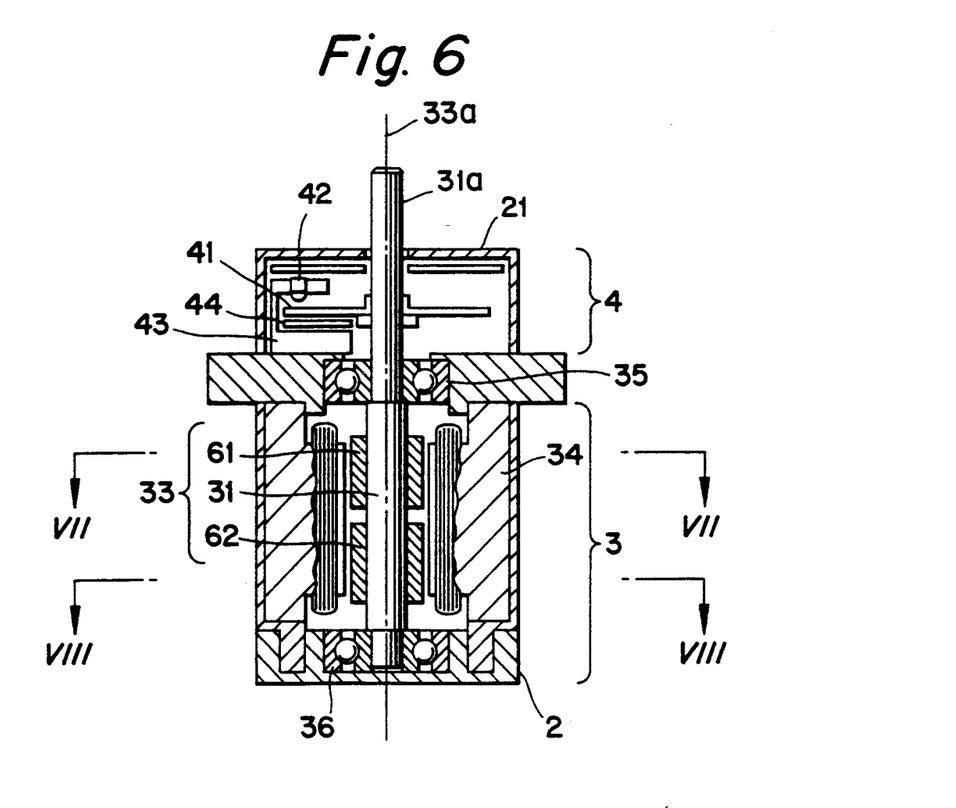
FIG. 6 is a longitudinal sectional view of a second embodiment of the electromagnetic motor according to the present invention.
Figure 7:
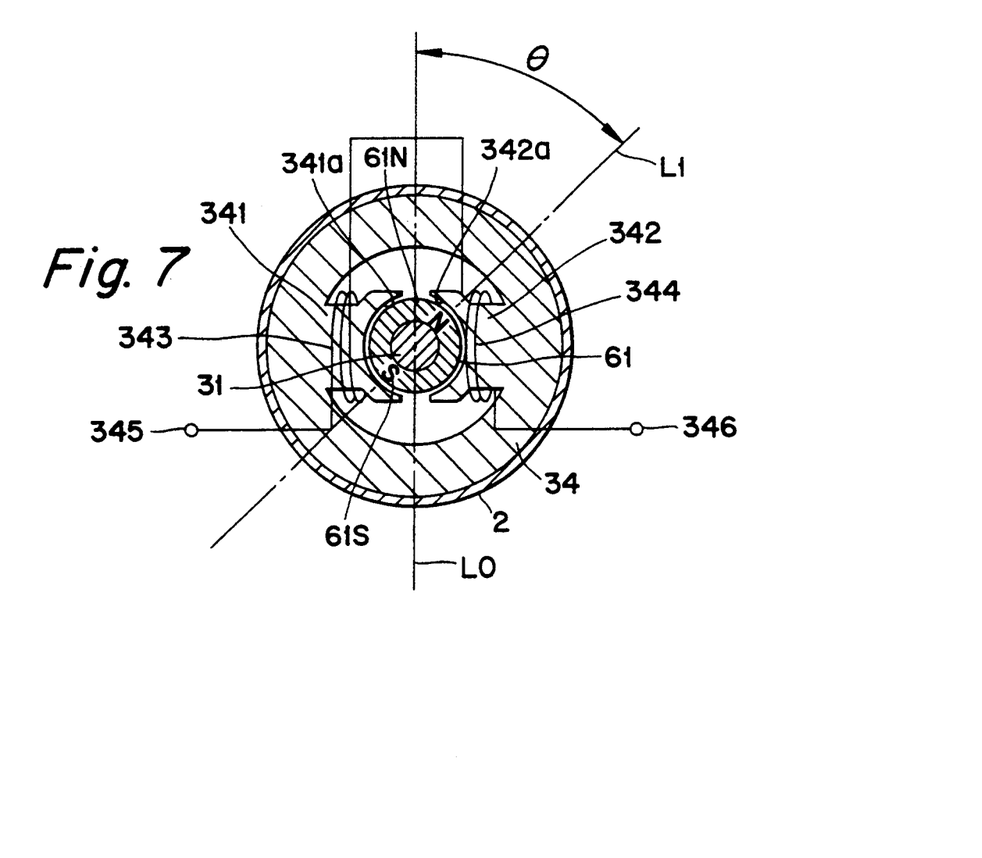
FIG. 7 is a cross-sectional view of the electromagnetic motor of FIG. 6 taken along line VII—VII.
Figure 8:
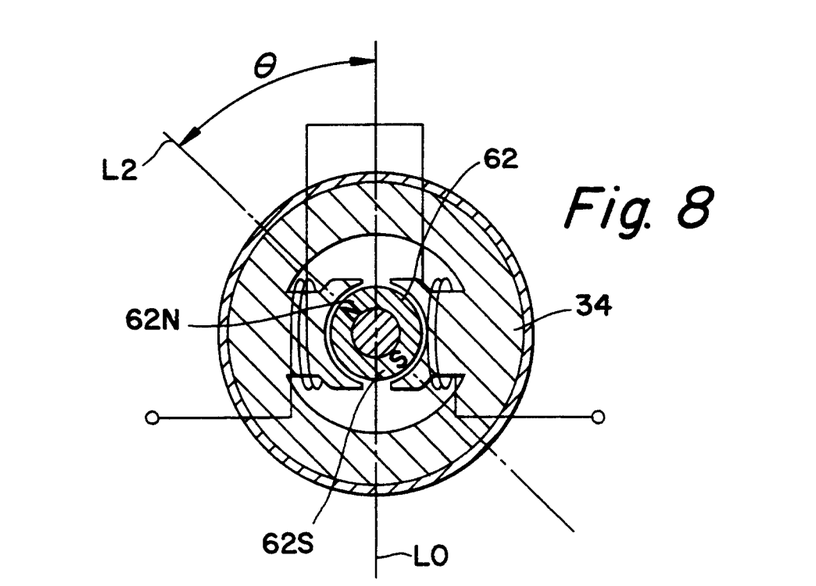
FIG. 8 is a cross-sectional view of the electromagnetic motor of FIG. 6 taken along line VIII—VIII.

FIGS. 6, 7 and 8 illustrate a second embodiment of the electromagnetic motor according to the present invention. Since the electromagnetic motor 6 of the second embodiment has generally the same structure as that of the electromagnetic motor 1 of the first embodiment, in the drawings, the corresponding portions thereof are denoted by the same reference numerals as those in FIGS. 1 to 4, and no further explanation will be given. In the present embodiment, the electromagnetic motor 6 has a rotor 33 provided with first and second ring-shaped permanent magnets 61 and 62. These permanent magnets 61 and 62 are disposed coaxially and apart from each other in the axial direction on the outer surface of the rotational shaft 31.

FIG. 7 is a sectional view of the electromagnetic motor 6 showing the rotor 33 positioned at the initial rotational angular position defined by a diameter L0. As shown in this drawing, the first permanent magnet 61 has a magnetic N pole 61N and a magnetic S pole 61S positioned at opposite sides on a diameter L1. The diameter L1 is positioned offset in the clockwise direction from the diameter L0 of the initial position of the rotor 31 by an angle $\Theta$. On the other hand, as shown in FIG. 8, the second permanent magnet 62 has a magnetic N pole 62N and a magnetic S pole 62S positioned at opposite sides on a diameter L2. The diameter L2 is positioned offset in the counterclockwise direction from the diameter L0 of the initial position by an angle $\Theta$. Thus, the poles N and S of the first permanent magnet 61 are offset by 2 Θ from those of the second permanent magnet 62. The value of Θ is set between 45 and 90 degrees. Thus, the offset between the poles of the first and second permanent magnets 61 and 62 is between 90 and 180 degrees.

According to the present embodiment, in a non-excited condition, the rotor 33 of the electromagnetic motor 6 is positioned at the initial rotational angular position defined by the diameter L0 as shown in FIGS. 7 and 8. Since the N and S poles of the first and second permanent magnets 61 and 62 are offset from each other by an angle 2 Θ, magnetic forces produced between the first permanent magnet 61 and the stator 34 and between the second permanent magnet 62 and the stator 34, respectively, combine to form a torque for returning the rotor 33 to the initial angular position L0. When the field windings 343 and 344 are applied with drive power under the control of magnetic-field control circuit (not shown), the rotor 33 is rotated to an angular position that depends on the magnitude of magnetic field between the rotor 33 and stator 34.

Third Embodiment

Figure 9:
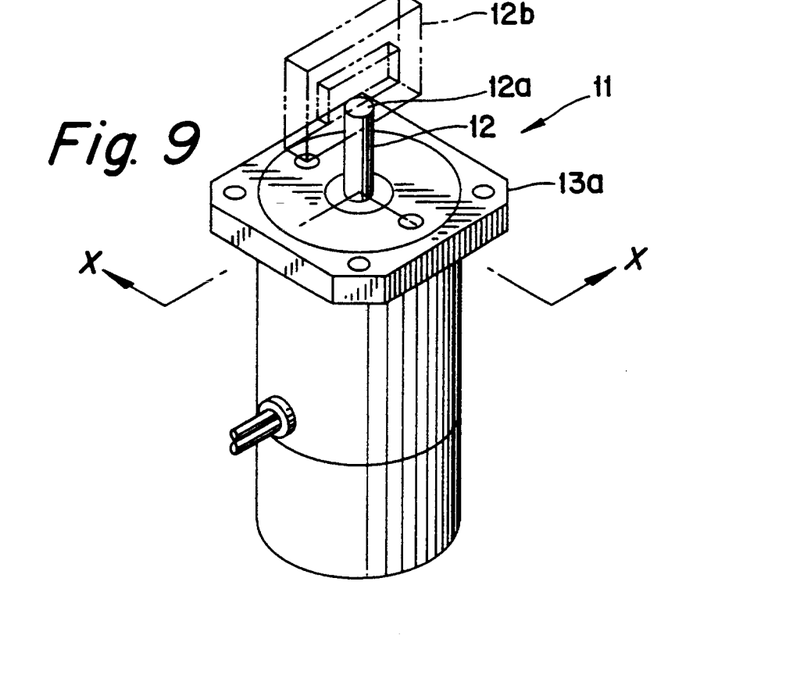
FIG. 9 is a perspective view of a third embodiment of the electromagnetic motor according to the present invention.

FIG. 9 illustrates a third embodiment of the electromagnetic motor according to the present invention. The electromagnetic motor 11 is of generally column-like configuration and is provided at the front end with a rectangular flange 13a. A rotational shaft 12 has an output shaft portion 12a projecting from the front end of the motor 11 on which a driven member 12b such as a mirror or the like is mounted.

Figure 10:
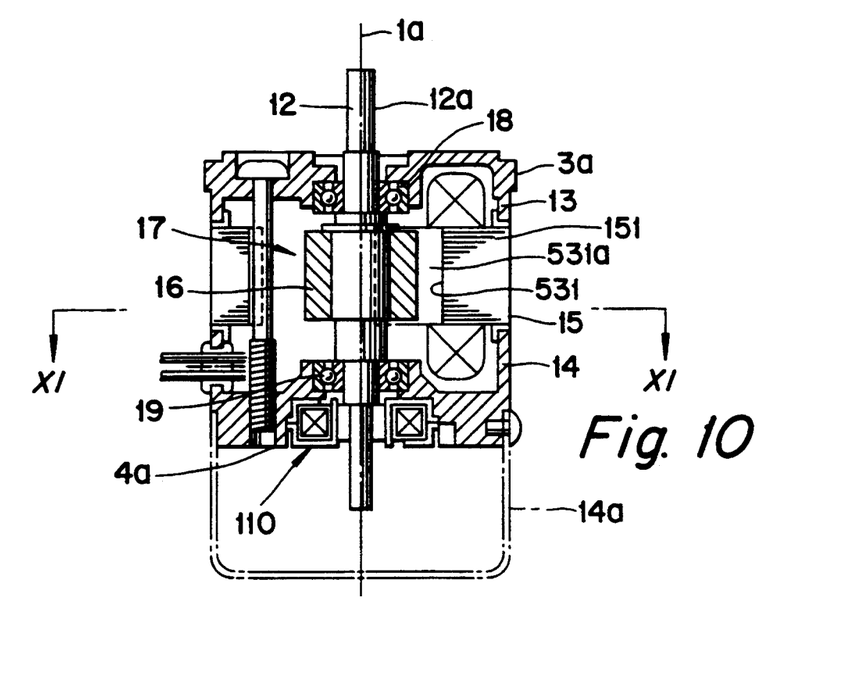
FIG. 10 is a longitudinal sectional view of the electromagnetic motor of FIG. 9 taken along line X—X in FIG. 9.

FIG. 10 is a sectional view of the motor 11 taken along line X—X of FIG. 9. As shown in this figure, the motor 11 has a front casing 13 provided with the flange 13a, a rear casing 14 and a motor stator 15 sandwiched between the casings 13 and 14, these elements being arranged coaxially. The rotational shaft 12 of the motor 11 is disposed to pass through the center thereof. The rotational shaft 12 is provided on the outer surface facing the stator 15 with a ring-shaped permanent magnet 16, to constitute a rotor 17. The ring-shaped permanent magnet 16 is formed with a pair of poles N and S. The rotational shaft 12 of the rotor 17 is rotationally mounted on the front and rear casings 13 and 14 by means of ball bearings 18 and 19. The rotational shaft 12 has a rear end projecting from the casing 14 and enclosed by a cup-shaped casing 14a. A rotational speed sensor 110 is accommodated in the rear casing 14 for detecting a rotational speed of the rotational shaft 12 of the motor 11.

Figure 11:
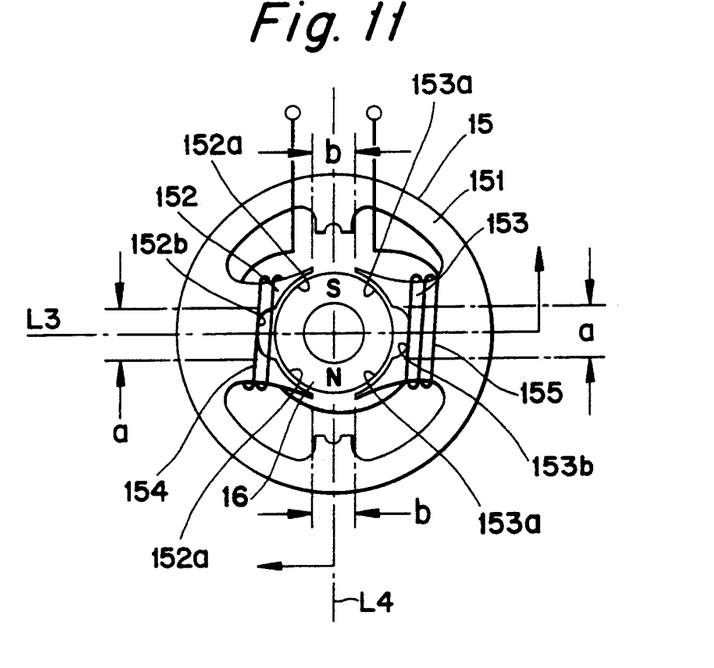
FIG. 11 is a cross-sectional view of the electromagnetic motor of FIG. 10 taken along line XI—XI in FIG. 10.

Referring now to FIGS. 10 and 11, the structure of the stator 15 of the motor 11 will be described. The stator 15 comprises a ring-shaped body portion 151, a pair of magnetic pole portions 152 and 153 projecting from the inner surface of the body portion 151 radially and inwardly, and field windings 154 and 155 wound about the magnetic pole portions 152 and 153, respectively. The pair of magnetic pole portions 152 and 153 are positioned at opposite sides on a diameter L3, and are formed at front ends facing the permanent magnet 16 with magnetic pole surfaces 152a and 153a so as to form a constant air gap between these surfaces and the permanent magnet 16. The field windings 154 and 155 are connected to a power source (not shown) via power lines and a magnetic-flux control circuit (also not shown). The magnetic-flux control circuit controls the current supplied to the field windings so that the rotor 17 is rotated within a limited angular range of, for example, 30 degrees by a magnetic torque produced between the stator 15 and the rotor 17. The magnetic-flux control circuit can be one of conventional type.

In the present embodiment, the magnetic pole surface 152a is formed at the center portion with a groove 152b extending axially. Owing to the presence of the groove 152b, the gap between the magnetic pole surface 152a and the rotor 17 is larger at the center portion thereof. The width of this larger gap, that is, of the groove 152b, is set to satisfy a>b, wherein a is the width of the groove 152b and b is the gap between the adjacent magnetic pole portions 152 and 153 shown in FIG. 11. Likewise, the other magnetic pole surface 153a is formed with a groove 153b. The width a of the groove 153b is also set to satisfy a>b.

According to the present embodiment, a magnetic torque is produced which forces the rotor 17 to rotate to the initial angular position L4 perpendicular to the diameter L3 on which the magnetic pole portions 152 and 153 of the stator are positioned. Therefore, in a non-excited condition, the rotor 17 stays at the initial angular position L4 wherein the magnetic poles of the rotor 17 are aligned with L4 and are angularly offset 90 degrees from the magnetic pole portions 152 and 153 of the stator 15. The width, depth and shape of the grooves 152b and 153b can be varied so long as a>b is satisfied.

Figure 12:
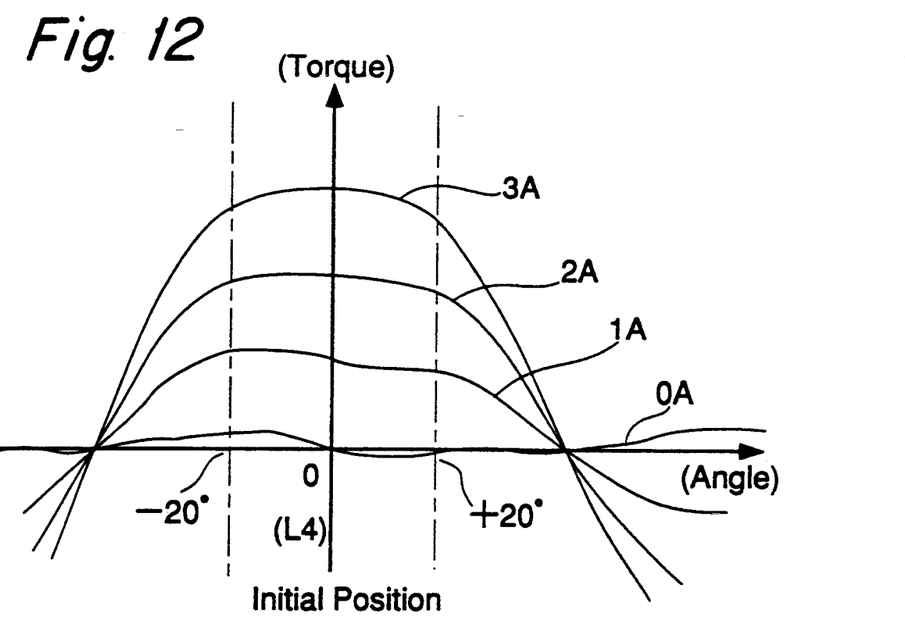
FIG. 12 is a graph showing characteristic curves of a magnetic torque acting on the rotor of the electromagnetic motor of FIG. 9 plotted with respect to rotational angle measured from the initial angular position of the rotor.

FIG. 12 is a graph showing characteristic curves of the magnetic torque T acting on the rotor 17 of the motor 11 plotted with respect to rotational angle measured from the initial angular position L4 of the rotor 17. The characteristic curve 0A was obtained where the field windings 154 and 155 were not excited, and those 1A, 2A and 3A were obtained where the field windings 154 and 155 were applied with currents of 1 A, 2 A and 3 A, respectively. As can be seen from the curve 0A, the magnetic torque T serves to return the rotor 17 to the initial angular position L4. In addition, according to the present embodiment, it has been found that the motor 11 exhibits an excellent characteristic in that the generated magnetic torque T is stably maintained, especially in the range of 20 degrees in both directions from the initial angular position L4.

Fourth Embodiment

Figure 13:
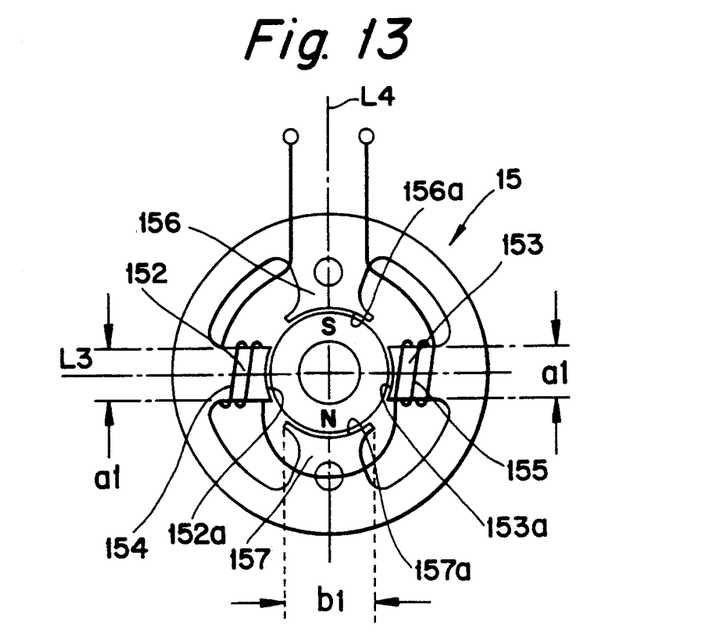
FIG. 13 is a cross-sectional view of a fourth embodiment of the electromagnetic motor according to the present invention; and, FIG. 14 is a graph showing characteristic curves of a magnetic torque acting on the rotor of the electromagnetic motor of FIG. 13 plotted with respect to rotational angle measured from the initial angular position of the rotor.

As a mechanism for returning to the rotor 17 to the initial angular position L4 and holding it therein in a non-excited condition, a pair of auxiliary magnetic poles may be formed between the magnetic poles 152 and 153 instead of forming the grooves 152b and 153b as mentioned above. FIG. 13 illustrates an electromagnetic motor provided with such a mechanism. As shown in this figure, the stator 15 is formed with a pair of auxiliary magnetic poles 156 and 157 offset 90 degrees from the main magnetic poles 152 and 153. The auxiliary magnetic poles 156 and 157 have pole surfaces 156a and 157a, respectively, and the width of these pole surfaces is set larger than that of the pole surfaces 152a and 153a of the main magnetic poles 152 and 153. That is, where b1 is the width of the pole surfaces 156a and 157a and a1 is that of the pole surfaces 152a and 153a, b1>a1 is satisfied.

According to the present embodiment, a magnetic torque is produced which forces the rotor 17 to rotate to the initial angular position L4 perpendicular to the diameter L3 on which the magnetic pole portions 152 and 153 are positioned. Therefore, in a non-excited condition, the rotor 17 stays at the initial angular position L4 wherein the magnetic poles of the rotor 17 are aligned with L4 and are angularly offset 90 degrees from the magnetic pole portions 152 and 153 of the stator 15. The size of the auxiliary poles 156 and 157 can be varied so long as b1>a1 is maintained.

Figure 14:
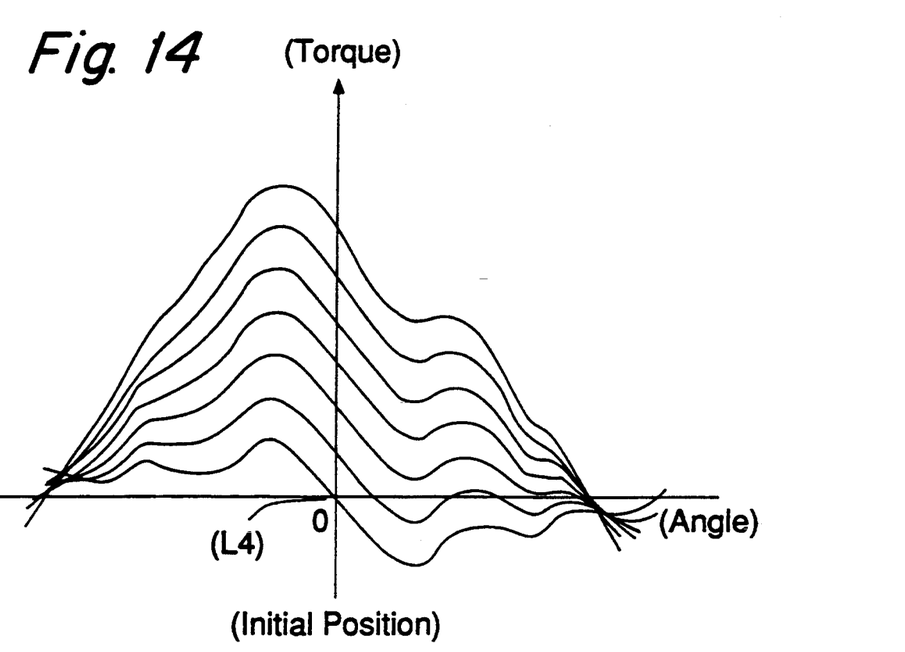

FIG. 14 is a graph showing characteristic curves of the magnetic torque T acting on the rotor 17 of the motor 11 plotted with respect to rotational angle measured from the initial angular position L4 of the rotor 17.

We claim:

1. An electromagnetic motor of the finite rotational type, comprising:
   a rotor;
   a stator surrounding said rotor including ferromagnetic material and coil windings forming a plurality of stationary electromagnetic poles;
   bearing means for supporting said rotor rotationally at least in a predetermined angular range between −90/n degrees to +90/n degrees relative to an initial angular position, wherein n is a positive integer, wherein said rotor being controllably rotatable to a desired angular position within said predetermined angular range by controlling a magnetic flux between the poles of the rotor and the electromagnetic poles of the stator;
   rotor-returning means for exerting a magnetic force to return said rotor to an initial rotational angular position and holding it therein when said electromagnetic motor is in a non-excited condition, said rotor-returning means including first and second ring-shaped permanent magnets mounted on said rotor coaxially with a rotational axis of the rotor; and
   each of said first and second ring-shaped permanent magnets having an plurality of magnetic N and S poles equal in number to the poles of the stator, said poles being positioned diametrically from each other, said magnetic poles of said first ring-shaped permanent magnet being positioned offset in the circumferential direction from those of said second ring-shaped permanent magnet by an angle in the range of 90 degrees to 180 degrees, whereby a resultant magnetic force is generated to act on said rotor which functions as a torque for returning the rotor toward the initial angular position.

2. An electromagnetic motor of the finite rotational type, comprising:
   a rotor with 2n permanent magnet poles wherein n is a positive integer;
   a stator surrounding said rotor including ferromagnetic material and coil windings forming a plurality of main stationary electromagnetic poles;
   bearing means for supporting said rotor rotationally at least in a predetermined angular range, wherein said rotor is controllably rotatable to a desired angular position within said predetermined angular range by controlling a magnetic flux between the poles of the rotor and the electromagnetic poles of the stator;
   rotor-returning means for exerting a magnetic force to return said rotor to a predetermined rotational angular position and holding it in said predetermined position when said electromagnetic motor is in a non-excited condition; and
   said rotor-returning means having 2n auxiliary poles arranged on said stator wherein n is a positive integer, said auxiliary poles being offset $360 \div 4n$ degrees of angle in the circumferential direction with respect to said main magnetic poles of said stator;
   wherein a width of each of said auxiliary poles is larger than a width of said main magnetic poles of said stator so as to generate a magnetic torque to act on said rotor to force the magnetic poles of said rotor to stay in an angular position of $360 \div 4n$ degrees of angle apart from said main magnetic poles of said stator.

3. An electromagnetic motor of the finite rotational type, comprising:
   a rotor having a permanent magnet with 2n magnetic poles, wherein n is a positive integer;
   a stator surrounding said rotor including ferromagnetic material and coil windings forming a plurality of stationary electromagnetic poles;
   beating means for supporting said rotor rotationally at least in a predetermined angular range between −90/n degrees to +90/n degrees relative to an initial angular position;
   means for maintaining said rotor at any desired angular position within said predetermined angular range by controlling a magnetic flux between the poles of the rotor and the electromagnetic poles of the stator; and
   rotor-returning means for exerting a magnetic force to return said rotor to an initial rotational angular position and holding it therein when said electromagnetic motor is in a non-excited condition;
   wherein said rotor-returning means includes a permanent magnet fixedly mounted on said stator to face said permanent magnet of said rotor so that a magnetic attractive force is generated between said permanent magnets of said rotor and said stator.

4. An electromagnetic motor as set forth in claim 3, further comprising a photo-potentiometer for sensing a rotational angular position of said rotor, the photo-potentiometer having a light emitting element, a light receiving element, and a rotational member integrally rotating with said rotor and defining a light path from said light emitting element to said light receiving element, wherein said rotational member for defining the light path is formed with a portion through which light can pass, and said light-passing portion is configured so that said light path defined thereby is shifted in accordance with the rotational angular position of said rotor.

5. An electromagnetic motor as set forth in claim 4, wherein said light emitting element is a laser diode.

6. An electromagnetic motor as claimed in claim 4, wherein said rotational member includes a slit plate having a spiral slit with a center of said spiral slit coinciding with a rotational axis of said rotor.

7. An electromagnetic motor as set forth in claim 3, further comprising a photo-potentiometer for sensing a rotational angular position of said rotor, the photo-potentiometer having a light emitting element, a light receiving element, and a rotational member integrally rotating with said rotor and defining a light path from said light emitting element to said light receiving element, wherein said rotational member for defining the light path is formed with a light-reflective region, and said light-reflecting region is configured so that said light path defined thereby is shifted in accordance with the rotational angular position of said rotor.

8. An electromagnetic motor as set forth in claim 7, wherein said light emitting element is a laser diode.

9. An electromagnetic motor of the finite rotational type comprising:

a rotor with 2n permanent magnet poles wherein n is a positive integer;

a stator surrounding said rotor including ferromagnetic material and coil windings forming n pairs of stationary electromagnetic poles;

bearing means for supporting said rotor rotationally at least in a predetermined angular range wherein said rotor can be controllably rotated to a desired angular position within said predetermined angular range by controlling a magnetic flux between the poles of the rotor and the electromagnetic poles of the stator;

rotor-returning means for exerting a magnetic force to return said rotor to a predetermined rotational angular position and holding said rotor in said predetermined position when said electromagnetic motor is in a non-excited condition;

each of said magnetic poles of said stator having a groove formed on a surface facing the rotor, said groove being setback from an outer surface of said rotor and extending in a direction parallel to a rotational axis of said rotor; and wherein a width of said grooves is larger than a gap between adjacent magnetic poles of said stator so as to generate a magnetic torque for forcing the magnetic poles of the rotor to stay in an angular position of 360÷4n degrees of electrical angle apart from said poles of said stator.

10. An electromagnetic motor as set forth in claim 9, further comprising a photo-potentiometer tier sensing a rotational angular position of said rotor, the photo-potentiometer having a light emitting element, a light receiving element, and a rotational member integrally rotating with said rotor and defining a light path from said light emitting element to said light receiving element, wherein said rotational member for defining the light path is formed with a portion through which light can pass, and said light-passing portion is configured so that said light path defined thereby is shifted in accordance with the rotational angular position of said rotor.

11. An electromagnetic motor as claimed in claim 10, wherein said rotational member includes a slit plate having a spiral slit with a center of said spiral slit coinciding with a rotational axis of said rotor.

* * * * *